United States Patent [19]

Thompson

[11] Patent Number: 5,053,887
[45] Date of Patent: Oct. 1, 1991

[54] TECHNIQUE FOR PRODUCING A FINE GRAINED DITHERED HALFTONE IMAGE HAVING AN INCREASED NUMBER OF GRAY LEVELS

[75] Inventor: Gerhard R. Thompson, Wappingers Falls, N.Y.

[73] Assignee: IBM Corporation, Armonk, N.Y.

[21] Appl. No.: 372,736

[22] Filed: Jun. 27, 1989

[51] Int. Cl.$^5$ .............................................. H04N 1/40
[52] U.S. Cl. .................................... 358/457; 358/455; 358/456
[58] Field of Search ............... 358/455, 456, 457, 458, 358/461; 382/51, 54

[56] References Cited

U.S. PATENT DOCUMENTS

| | | | |
|---|---|---|---|
| 4,547,811 | 10/1985 | Ochi et al. | 358/455 |
| 4,654,721 | 3/1987 | Goertzel et al. | 358/283 |
| 4,760,460 | 7/1988 | Shimotohno | 358/457 |
| 4,800,443 | 1/1989 | Crinon et al. | 338/280 |
| 4,823,189 | 4/1989 | Haines et al. | 358/75 |

OTHER PUBLICATIONS

G. Goertzel et al, "Digital Halftoning on the IBM 4250", IBM Journal of Reserach and Development, vol. 31, No. 1, Jan. 1987, pp. 2-15.
R. Ulichney, Digital Halftoning (London: The MIT Press, Jun. 27, 1989, pp. 84-98.

Primary Examiner—Donnie L. Crosland
Assistant Examiner—Thomas D. Lee
Attorney, Agent, or Firm—Peter L. Michaelson

[57] ABSTRACT

A technique for producing a dithered halftoned pattern for reproduction on a binary printer having a limited resolution where the halftoned pattern has a relatively fine screen ruling and, for a given size dither matrix, can depict an increased number of gray levels. Specifically, with this technique, gray level error is propagated from tile to tile and based upon the total gray level value for a current tile, which includes both the gray value for that tile itself and the gray level error propagated thereto, one of a number of different threshold matrices is selected. The selected matrix is then used to generate a dithered halftone pattern within the corresponding tile in an output halftoned image in order to depict a desired intermediate gray level in a corresponding area of that image. The threshold matrices produce corresponding dither patterns that illustratively differ by one darkened pel. As such, the differing dither patterns, when appearing for example in an area of a uniform coloration within a halftone tone image and viewed by the eye of a human observer, are spatially integrated together to advantageously produce an intermediate gray value in that area that can not be produced through use of either dither pattern alone.

14 Claims, 8 Drawing Sheets

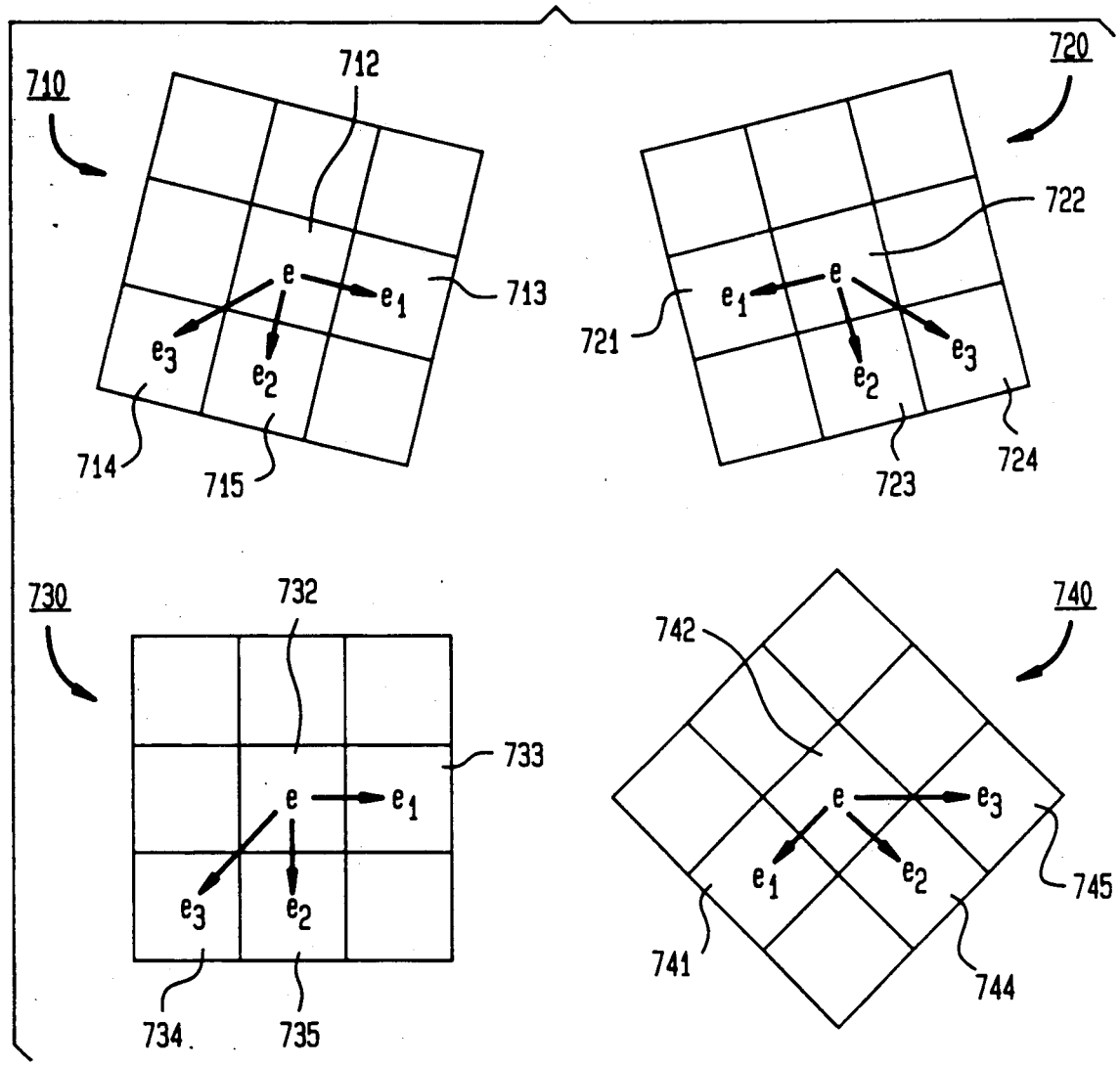

| DOT# | NORMALIZED GRAY VALUE |
|------|------------------------|
| 0    | 0                      |
| 1    | 97                     |
| 2    | 147                    |
| 3    | 187                    |
| 4    | 209                    |
| 5    | 229                    |
| 6    | 240                    |
| 7    | 243                    |
| 8    | 245                    |
| 9    | 254                    |
| 10   | 255                    |

| LINE | TILE | $g_0$ | $g_e$ | $t_0$ | $t_5$ | e | x | $e_3$ | $e_1, e_2$ |
|---|---|---|---|---|---|---|---|---|---|
| 1 | 801 | 70 | 70 | 0 | 0 | 70 | .303 | 39 | 15 |
| 2 | 802 | 80 | 80+15 | 0 | 0 | 95 | .039 | 27 | 34 |
| 3 | 803 | 90 | 90+34 | 0 | 97 | 27 | .438 | 19 | 4 |
| 4 | 804 | 110 | 110+15+27 | 97 | 147 | 5 | .258 | 3 | 1 |
| 5 | 805 | 120 | 120+34+19+1 | 97 | 147 | 27 | .155 | 11 | 8 |
| 6 | 806 | 130 | 130+4+8 | 97 | 97 | 45 | .073 | 15 | 15 |

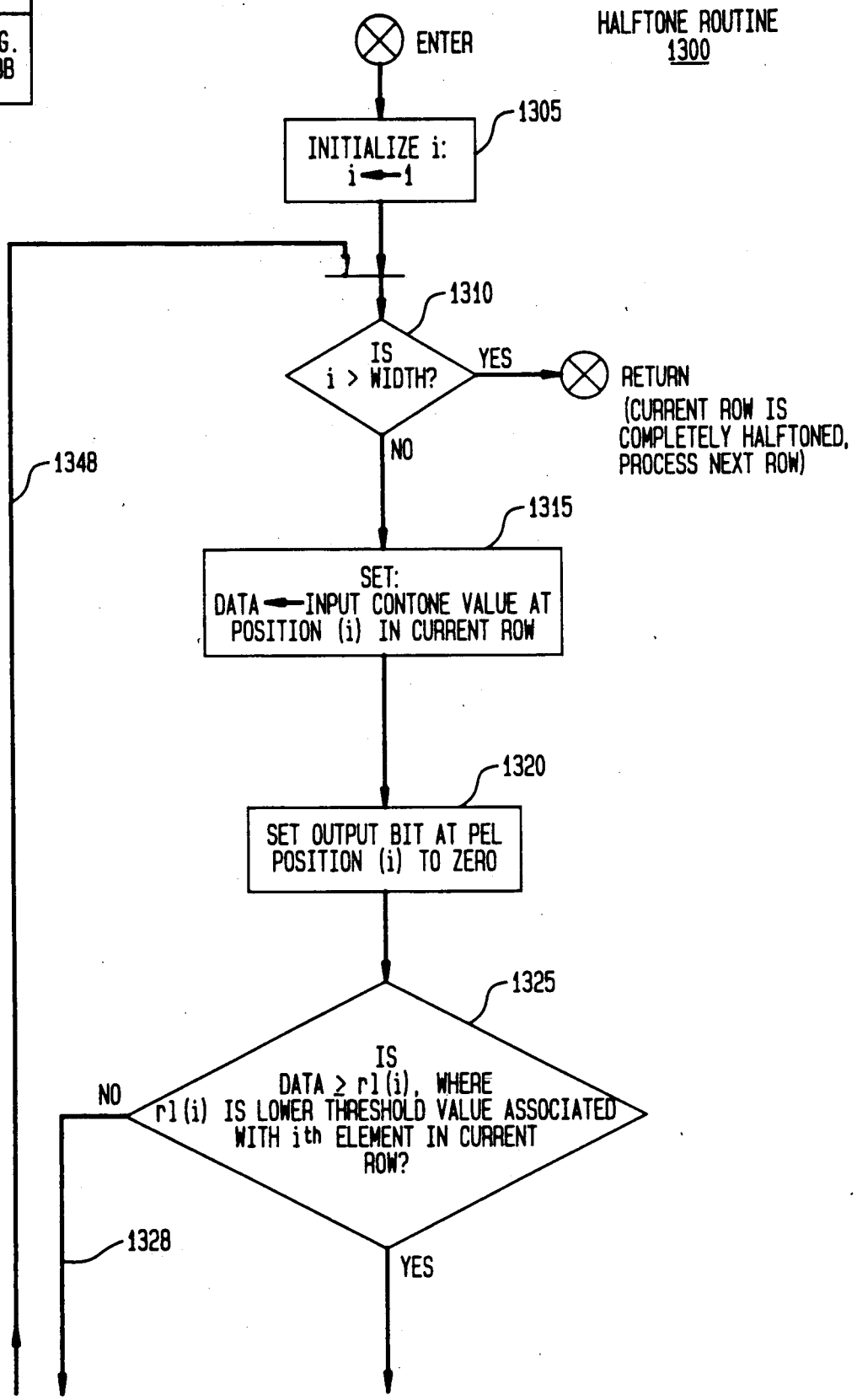

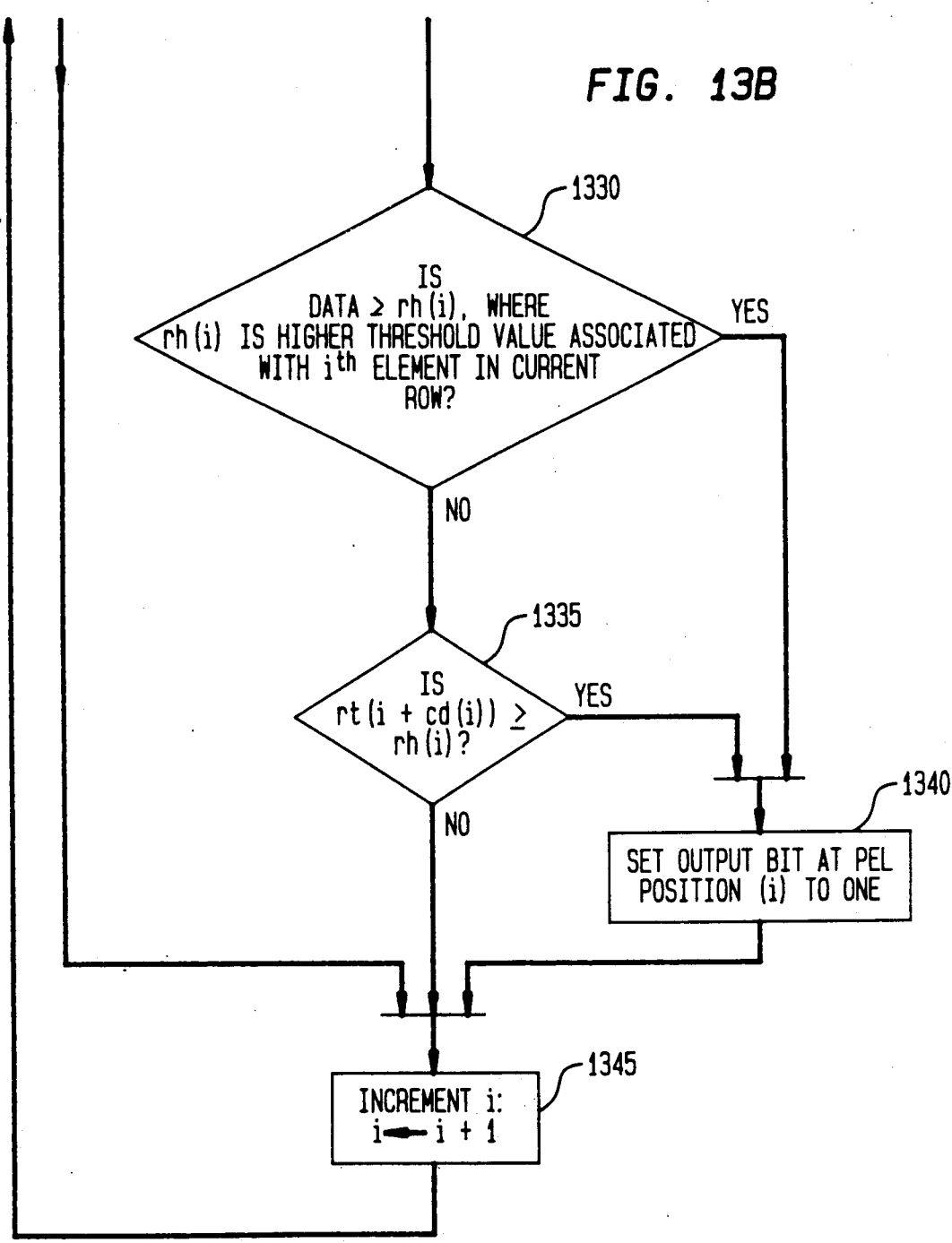

TECHNIQUE FOR PRODUCING A FINE GRAINED DITHERED HALFTONE IMAGE HAVING AN INCREASED NUMBER OF GRAY LEVELS

BACKGROUND OF THE INVENTION

1. Field of the Invention

The invention generally relates to a technique that employs dithering for producing a halftoned bit pattern for reproduction on a binary printer having a limited, though preferably a relatively high, resolution where the halftoned bit pattern has a relatively fine screen ruling and, for a given sized dither matrix, can depict an increased number of gray levels and specifically to such a technique that employs both dithering and error propagation.

2. Description of the Prior Art

Although electronic communication is becoming rather ubiquitous, currently the printed page is still the predominant form of communication. A printed page contains text, graphics and/or images.

In the graphic arts industry, a page that will be mass reproduced is commonly referred to as an artwork. Traditionally, artworks were produced using manual document creation and page composition processes. Unfortunately, such manual processes proved to be tedious and costly. As such, electronic systems that create images, graphics and text and provide electronic page composition capabilities are seeing increasing use. With these electronic systems, an artwork, owing to its inclusion of graphics and/or images, is often stored in bit-mapped form for reproduction on an output device, such as a printer. For black and white artworks, each location in the bit-map contains a binary value that specifies whether that location in the artwork is either white or black. For gray level or color artworks, each location in a pixel-map contains a multi-bit value that respectively corresponds to the particular color or monochromatic shade that exists at that location in the artwork. Now, even though an artwork can be processed and stored electronically, a paper reproduction of that artwork onto a printed page will ultimately need to be made, particularly if that page will form part of a publication, such as a magazine.

Currently, printing presses of one form or another are generally used to provide accurate mass reproductions of a color artwork. To avoid the need to use a differently colored ink in the press to print each different color in the artwork, current printing techniques rely on the fact that many colors can be obtained as a linear combination of four primary subtractive colors: cyan, yellow, magenta and black. As such, to print a multi-colored artwork, four printed monochromatic images, each made from a corresponding primary colored ink, are successively made in separate printing passes on a common sheet of printing stock and overlaid on that sheet with proper registration to yield a single multi-colored page that, when viewed by an observer, accurately replicates the tonal colorations of a given artwork.

In particular, a colored artwork that is to be printed is first separated, typically by optical filtering and photographic processes, into four primary color continuous tone ("contone") separations. Each separation is essentially a monochromatic two-dimensional depiction on a transparent medium of density values for the color information for only one of the p ary colors in the artwork. As such, a different separation exists for cyan, yellow, magenta or black. However, only one separation (typically black) would be used for single color gray-scale artworks. Unfortunately, printing presses are not able to apply a differential amount of a colored ink to any one location in a page. As such, a printing press can not directly print a contone separation. To surmount this obstacle, the art teaches the use of halftone separations. A halftone separation is formed through screening a contone separation. With no tonal variations, each halftone separation contains a regularly spaced two-dimensional pattern of relatively small monochromatic dots with a resolution in most graphic arts applications of at least 85 dots/inch (approximately 34 dots/centimeter (cm)). Such a regular dot pattern has a relatively high spatial frequency. As a result of screening a contone separation that has tonal variations, the tonal variation from one location to the next in the separation changes the diameter of the dots located in corresponding locations in a halftone separation (i.e. the diameter of individual dots increases while the center-to-center spacing between adjacent dots remains constant as the contone values increase) thereby spatially modulating the underlying regular halftone dot pattern for that color. Hence, when the halftone separation is viewed by a human eye, the modulated pattern is integrated by the eye to yield the corresponding tonal variations. Once the four halftone separations are made, these separations are transferred to separate printing plates which, in turn, are subsequently used to print four halftone separation patterns on common sheets of printing stock with proper registration. When the resulting printed sheet is then viewed by an observer, an accurate depiction of the desired colored artwork results from the spatial interaction of the four overlaid primary colored halftone separation patterns.

In well known lithographic printing techniques, each primary color contone separation is photographically generated from a contone image and then photographically screened, with different appropriate rotations that minimize objectionable Moire patterns, to yield a halftone separation. All the halftone separations of this contone image are then photographically combined to produce a "proof" image. Thereafter, if the proof image is acceptable, each halftone separation is then photographically transferred to a printing plate. This process which is manual is often tedious, time consuming and expensive. Hence, in an effort to reduce the time, expense and tedium associated with such manual photographic based processes, the art has turned to electronic techniques that are capable of directly printing a halftone separation form a contone separation. These techniques employ an electronic printer that has a relatively high resolution for directly printing a halftone separation on a suitable medium.

One such high resolution printer which is advantageously capable of and particularly suited for directly printing halftone separations is the IBM Model 4250 electro-erosion printer (IBM is a registered trademark of the International Business Machines Corporation in Armonk, N.Y.). This printer utilizes a special printing media formed of a thin aluminum layer overlaying either a dark contrast layer or a transparent undercoat. During printing, the printer produces each darkened pel in a printed page on this printing media by selectively vaporizing (electro-eroding) the aluminum film which is situated at that pel location on the print media. If printing media with a dark contrast layer is used, then this media, when eroded, could serve as a camera ready master for a halftone separation. Alternatively, if printing media with a transparent undercoat is used, then this media, when eroded, could serve as either a camera ready negative or short run printing plate. Through this printing process, this printer is able to provide an all points addressable resolution of 600 dots (pels) per inch which provides a printed halftone separation that is able to clearly depict rather fine detail.

To achieve very smooth edges on printed characters, rules and graphics, the IBM 4250 electro-erosion printer prints adjacent writing spots on a partially over-lapping basis. Inasmuch as the resolution of this printer, specifically 600 dots/inch (approximately 236 dots/cm), exceeds that at which a contone separation is typically scanned, the numeric density of the contone values must be upwardly scaled to match the resolution of this printer. Accordingly, a group of contone values in the scaled contone separation has a non-overlapping halftone block corresponding thereto and correspondingly situated in the printed bit-map therefor.

Printing halftone dots with varying diameters using such electronic printers has proven to be difficult. As such, dither techniques are often used instead. Specifically, with a dither technique, different gray values are reproduced by printing a specific pre-defined halftone pattern in each halftone block or by thresholding each scaled contone value with an appropriate threshold in a dither matrix. Depending upon the contone value associated therewith and the particular type of dither pattern being used, a halftone block may contain either a clustered or dispersed pattern of printed pels within that block. Inasmuch as a dither pattern is spatially integrated by the human eye, the illusion of a gray scale variation is provided by printing an increased or decreased number of darkened pels in the pattern for each halftone block. The resultant output pattern has a definite structure, i.e. a grid at a pre-defined angle, that advantageously appears very similar to a corresponding pattern of halftone dots produced by well known photographic screening processes.

The art teaches that the size of a halftone block is dictated by two opposing factors: as the size of each halftone block increases, the number of gray levels that can be depicted by that block increases inasmuch as there are additional pixels that can be successively darkened to provide additional dither patterns, however the resolution of the resulting halftoned image may simultaneously decrease, i.e. as the block increases in size the halftoned image becomes increasingly grainy. Moreover, as the size of each halftone block increases, low frequency patterns tend to appear in areas of uniform gray level that occur in the halftoned image.

Currently, high quality image scanners produce a resolution of approximately 200 pixels/inch (approximately 79 dots/cm) or higher. With a printable resolution of 600 dots/inch provided by the IBM 4250 printer and with these constraints on halftone block size in mind, the art teaches that use of a rectangular halftone block of 3 by 6 pels for a total of 18 pels provides a good quality halftoned separation. Each block is associated with two adjacent input pixels and generally represents the gray value that is closest to the average value of the two pixels. By using 18 pels, each halftone block can be used to depict any one of 18 different dither patterns. Each dither pattern varies from a previously occurring pattern by the simple addition of one darkened pel to the previous pattern. Use of such a halftone block provides a screen ruling of 141 lines/inch (approximately 56 lines/cm) which approximately matches the 150 lines/inch (approximately 59 lines/cm) resolution used in high quality printing applications. In addition, each contone separation is scanned at a resolution of 200 pixels/inch.

I have found that in most instances 18 different gray levels are simply not enough to impart sufficient color variation to a color image formed of halftoned separations that have been directly printed through use of such a high resolution printer. In general, an insufficient number of gray levels tends to exist whenever a relatively small sized halftone block is used to provide a fine grained halftoned image.

Unless one is willing to accept a loss of resolution in the halftoned image——which is rarely the case, then the size of each halftone block can not be increased. As such, this fixes the size of each halftone block in the screened image. Now, it is well known in the art that the size of the dither matrix, i.e. the number of pels in a halftone block, limits the number of available gray levels that can be depicted by dither patterns residing therein. For example, with a dither matrix having 18 pels, the art teaches that this matrix can depict 18 different gray levels. See, e.g., R. Ulichney, *Digital Halftoning*, (London: The MIT Press, ® 1987 and particularly pages 84–98 thereof. In this regard, changing the individual dither patterns, such as from clustered to dispersed, without changing the size of the dither matrix itself has no affect on the number of available gray levels. As such, the art teaches that once the size of the dither matrix is fixed, then the number of available gray levels is also fixed with no intermediate gray levels capable of being produced.

Therefore, a need exists in the art for a technique that employs dithering for producing a halftoned bit pattern for reproduction on a relatively high resolution binary printer where the halftoned bit pattern has both a relatively fine screen ruling and can depict an increased number of gray levels for a given sized dither matrix over that heretofore taught in the art. Advantageously, this technique should produce an increased number of gray levels with nearly any, if not all, different halftone dither patterns and impart little, if any, low frequency patterns to the halftoned image.

SUMMARY OF THE INVENTION

Accordingly, an object of the present invention is to provide a technique that employs dithering for use in generating a halftoned bit pattern for reproduction using a binary printer wherein the halftoned pattern has both a relatively fine screen ruling and can depict an increased number of gray levels with a given sized dither matrix than that heretofore taught in the art.

A specific object is to provide such a technique that, for a given sized dither matrix, is capable of producing intermediate gray levels that heretofore have not been capable of being produced using halftone dithering methods taught in the art.

Another specific object is to provide such a technique that generates an increased number of gray levels with nearly any halftone dither pattern and does not inject an appreciable amount of low frequency patterns into the halftoned image.

These and other objects are provided in accordance with the teachings of my invention which generates a halftoned pel pattern for depicting intermediate gray levels in a corresponding portion of a continuous tone image formed of gray level pixel values. Specifically, my method first establishes a correspondence between identically shaped tiles that form a pre-defined tile pattern and individual pixel values that collectively form all or at least a portion of the continuous tone gray level image. Thereafter, a gray value, $g_0$, of the pixel values that correspond to each tile is determined. I have found that the gray value for a tile can be readily found as the value of the pixel situated in a location corresponding to the center of that tile or any fixed location therein. Once the gray values are determined, a threshold value, $t_0$, within a plurality of pre-defined threshold values is determined for each tile as equalling the highest threshold value less than or equal to the gray value $g_0$ for the tile. Thereafter, for each of the tiles, a gray level value, $g_e$, of the pixels that correspond to that tile is determined wherein the gray level value is formed in response to, and preferably the sum of, both the gray value of that tile and a propagated gray level error value associated therewith and propagated thereto. Next, a determination is made, for each of the tiles, as to whether the gray level value for that tile equals or exceeds the value of a successively larger threshold value, generally the next larger threshold value, contained within the plurality of pre-defined threshold values than threshold value $t_0$ associated with that tile. Based upon the result of this determination for each tile, a threshold value, $t_s$, is set for that tile as being either the threshold value $t_0$ for that tile or the successively larger threshold value. Once this occurs, an amount of gray value error, e, is ascertained for each of the tiles as equalling the gray level value, $g_e$, for that tile less the set threshold value, $t_s$, associated therewith. The gray value error, e, associated with substantially each of the tiles is then collectively propagated to at least one other tile in the tile pattern, and typically to three other tiles that are adjacent to the tile currently being processed, with the error being collectively propagated over the same paths from tile to tile throughout the tile pattern. Thereafter, the pixel values for each tile are dithered to form a halftone pel pattern corresponding thereto using one of a number, typically two, of different dither matrices with the selection of the particular dither matrix to be used for any given tile being determined by the value of threshold $t_s$ associated with that tile.

In accordance with a specific embodiment of my inventive technique, the two threshold matrices produce corresponding dither patterns that preferably differ from each other by one darkened pel. As such, by selecting different dither patterns, in response to the gray level value for each tile in a portion of a halftone image having for example a uniform coloration, these differing dither patterns appearing in the halftoned image, when viewed by the eye of a human observer, are spatially integrated (averaged) together to advantageously produce an intermediate gray level value in that image portion that can not be produced through use of either dither pattern alone.

BRIEF DESCRIPTION OF THE DRAWINGS

The teachings of the present invention may be readily understood by considering the following detailed description in conjunction with the accompanying drawings, in which:

FIG. 2 depicts an illustrative dither matrix for use with image portion 10 shown in FIG. 1;

FIG. 7 depicts various graphical examples of the manner in which error is collectively propagated on an identical basis from tile to tile in accordance with the present invention and particularly for the patterns shown in FIG. 1;

FIG. 8 depicts illustrative input pixel values for the image portion containing six tiles shown in FIG. 6;

FIG. 9 depicts the specific manner in which the tiles shown in FIG. 8 are processed to determine appropriate threshold values, particularly including error propagation from tile to tile;

FIG. 10 depicts threshold values that result from the tile processing shown in FIG. 9 for the image portion shown in FIG. 8;

FIG. 11 provides a resultant portion of a bit-mapped halftoned image showing those pels that will be darkened for the image portion shown in FIG. 8;

FIG. 13 shows the proper alignment of the drawing sheets for FIGS. 13A and 13B; and FIGS. 13A and 13B collectively depict a flowchart of Halftone Routine 1300 that is executed as part of Main Routine 1200 shown in FIGS. 12A and 12B.

To facilitate reader understanding, identical reference numerals have been used, where appropriate, to denote identical elements that are common to the figures.

DETAILED DESCRIPTION

Figure 1:
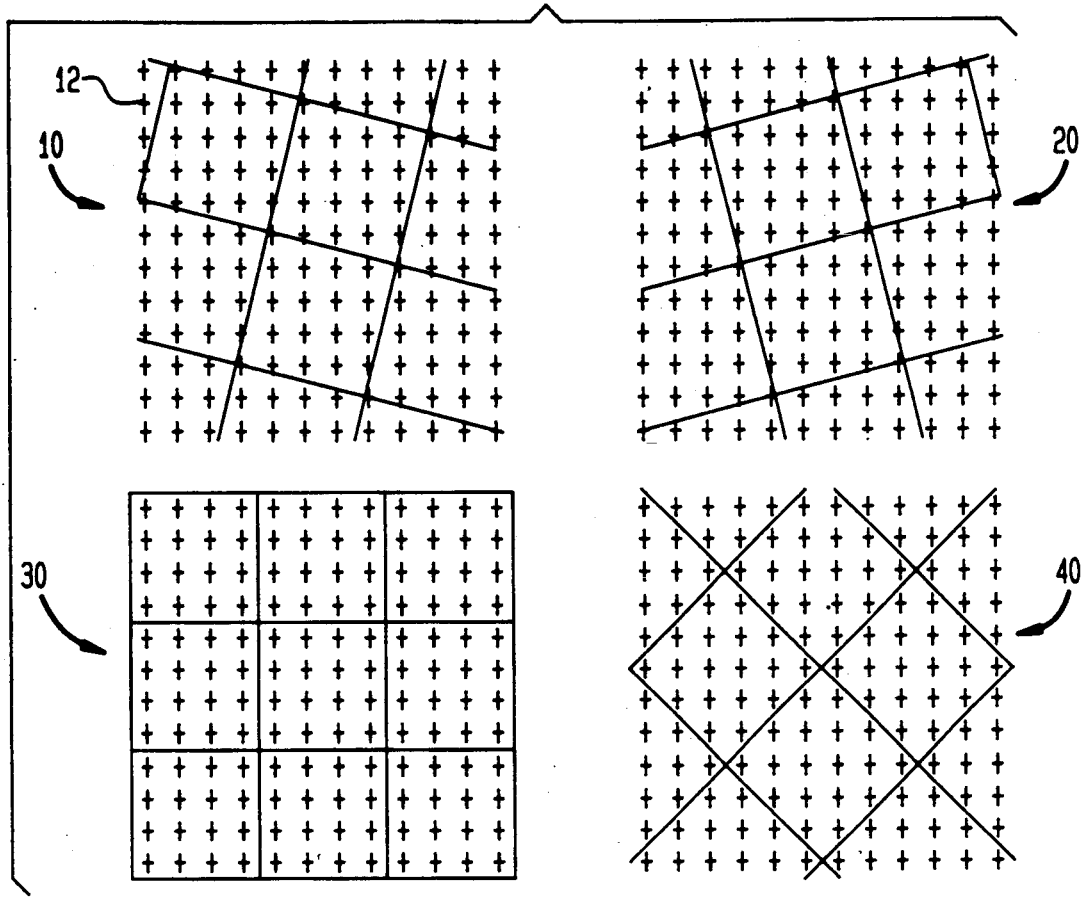
FIG. 1 depicts four examples of output locations partitioned into halftone pel pattern areas using orthogonal grid lines oriented at various screen angles.

After reading the following description, those skilled in the art will quickly realize that the inventive method will find application in a wide variety of different situations involving the generation of halftoned bit patterns using dither patterns. For purposes of illustration and to simplify the following discussion, the inventive technique will be discussed in the context of use with a printer that produces fixed sized pels at a resolution of 400 pels/inch (approximately 157 pels/centimeter (cm)) for simulating a halftone screen at approximately 97 dots/inch (approximately 38 dots/cm) and using a predefined dither pattern to depict each halftone dot that represents a corresponding group of continuous tone (contone) density values in a contone image that is to be halftoned. After considering the invention in this context, as described in detail below, those skilled in the art will clearly realize how to employ the inventive technique to provide intermediate gray levels using dither patterns with halftone blocks of other sizes and/or shapes, such as illustratively with rectangular 3-by-6 halftone blocks of pels for use with an IBM 4250 electro-erosion printer in directly printing a halftone image at a resolution of 600 pels/inch (approximately 236 pels/cm) and at a screen ruling approximating 141 lines/inch (approximately 56 lines/cm) from a continuous tone ("contone") single color separation that has been scanned at a resolution of 200 dots/inch (approximately 79 dots/cm).

For definitional purposes, a pel will hereinafter refer to any single writing spot, that is either light or dark, existing in a printed halftone image. A pixel, on the other hand, hereinafter refers to a single continuous tone density value, typically ranging between "0" and "255∞ inclusive, that is to be dithered with a threshold matrix to produce a printed pel.

Inasmuch my inventive technique requires that certain steps be performed prior to generating halftoned images on a given printer, I will first discuss these particular steps that collectively form an initialization procedure followed by discussing the error propagation and halftoning method as used in my inventive technique.

A. Initialization procedure

In essence, the initialization procedure, as discussed in detail below, determines the screen pattern, then establishes the dither matrices and the accompanying threshold matrices, and then defines the center of these matrices for subsequent use in printing halftoned images having a given set of parameters, i.e. screen size, dither pattern and output resolution. This procedure only needs to be undertaken once prior to the start of printing regardless of the number of images that will be subsequently printed, provided any of these parameters is not changed from one image to the next.

First, the desired size and shape of the screen pattern that is to be produced on the printer must be defined. Assume for purposes of illustration that a halftoned image having a 100 dot/inch screen pattern is to be generated using a printer that provides a 400 pel/inch output resolution. This entails that the halftoned image be partitioned into identically sized regions (hereinafter referred to as halftone blocks) that repeat on a regular pattern to form a screen pattern. Each region is used to depict a halftone dither pattern that represents a group of contone values situated in a corresponding image area. Inasmuch as the image is completely tiled with these blocks, the screen pattern produced in the halftone image takes on a grid-like appearance. Illustrative grids for various screen angles that form a portion of a printed halftone image are shown in FIG. 1, with each location at which a single pel can be printed, such as pel 12, marked by a "+" as shown in the figure.

The grid lines are illustratively shown in FIG. 1, as being orthogonal. My inventive technique only requires that the desired screen pattern contains identically shaped regions that repeat on a regular basis relative to an output print grid throughout a halftoned image. Hence, my inventive method can be successfully used with non-orthogonal grid lines. Since screens that use orthogonal grid lines are the most prevalent in the printing industry, the illustrative example will hereinafter be discussed in the context of having orthogonal grid lines.

With this in mind, image portions 10, 20, 30 and 40 respectively contain an orthogonal grid pattern oriented at −14, 14, 90 and 45 degrees with respect to a horizontal axis in the image. At illustratively a −14 degree screen angle, a pre-defined block of 17 pels (hereinafter referred to as a halftone block) is to be used to depict each halftone dither pattern. Clearly, other screen patterns can be used based upon the desired size and shape of the repeating halftone pattern that is to be produced by the printer. The size and shape of a halftone block dictates the size and shape, on a 1:1 basis, of the threshold matrix, as discussed hereinbelow.

Now, once the screen pattern is chosen, the particular dither patterns that are to be used in filling each halftone block must be defined. Substantially any dither patterns can be used, e.g. either clustered or dispersed, with the dither patterns taking on substantially any shape, such as for example an elliptical dot, and which can grow in any desired fashion that is required to fill the halftone block. Illustratively, for the screen pattern shown in image portion 10 in FIG. 1 which contains 17 individual pels within each halftone block, one possible sequence for filling these pels is shown in matrix form as matrix 200 in FIG. 2. Each location in the matrix, henceforth referred to as the dither matrix, spatially corresponds on a 1:1 basis with each pel in a tile in the screen pattern shown in image portion 10 in FIG. 1. Furthermore, the number in each location of the dither matrix specifies that order in which the corresponding pel in the tile is darkened to form a desired dither pattern. Specifically, the pel corresponding to the matrix location containing a "1" is often, depending upon actual data, darkened first, the pel corresponding to the matrix location containing a "2" is darkened next and so on throughout the matrix. With the illustrative matrix shown in FIG. 2, the 17 pels that are used to depict the dither patterns defined by matrix 200 are darkened at ten sequential steps, with six different pels being darkened at the "10th" step.

Figure 3:
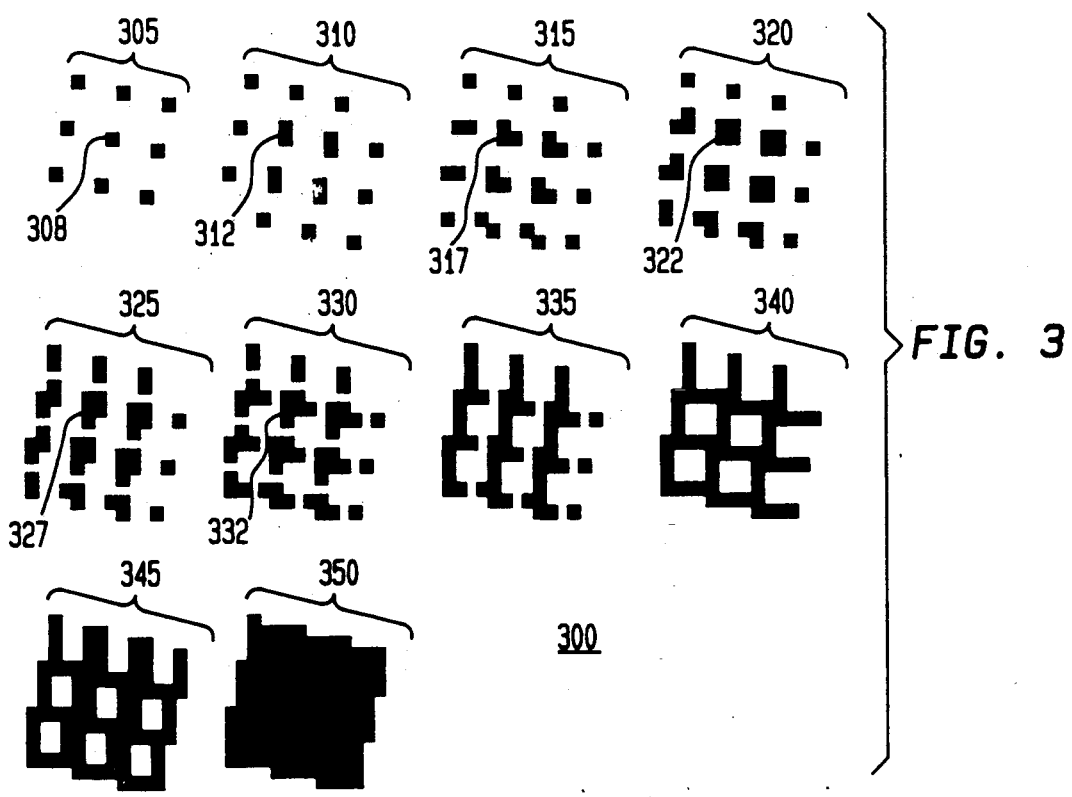
FIG. 3 illustratively depicts various image portions that each contains multiple dither patterns for increasing numbers of printed pels, wherein the patterns in the center of each portion correspond to the dither patterns defined by the dither matrix shown in FIG. 2.

FIG. 3 illustratively depicts various image portions 305, 310, 315, 320, 325, 330, 335, 340, 345 and 350 that each contains multiple dither patterns for increasing numbers of printed pels. Clearly as the number of printed pels in each dither pattern increases, the dither pattern spatially increases and thereby, when viewed by a human eye, depicts a correspondingly larger gray level value. The four dither patterns located in the center of each portion, e.g. dither pattern 308 in image portion 305, are defined by dither matrix 200 shown in FIG. 2 and sequentially grow in the manner defined by this matrix. Specifically, once a second pel in this dither pattern is darkened, pattern 308 becomes pattern 312 located in image portion 310. Likewise, as successive pels are darkened, the dither pattern defined by matrix 200 successively takes on the appearance of patterns 317, 322, 327, 332 located in respective image portions 315, 320, 325, and 330 and so on until all the pels in the dither pattern are darkened resulting in a centrally darkened area in image portion 350.

Once the desired dither patterns are defined, the normalized gray level associated with each pattern, as printed, must be determined and then appropriate threshold matrices constructed therefor. To do so, the printer is instructed to print a halftone image with a sufficiently large area that is uniformly tiled with only one of the dither patterns, illustratively that containing only one pel, such that all the patterns in this area contain an identical number of darkened pels situated in identical locations as specified by the dither matrix. A separate similarly uniformly tiled area is printed for each different dither pattern as incrementally defined by the dither matrix, e.g. two, three and so on up to ten, for dither matrix 200 shown in FIG. 2. In the case of an image printed on an opaque material, the reflectance (an analog value that varies from a high value for white to a low value for black) of each pattern is then optically measured using any one of several well known techniques. The resulting reflectance values are then converted into digital density values between "0" (illustratively for white) and "255" (illustratively for black) and normalized such that the pattern that contains no printed pels, i.e. all white, is associated with a density value of "0" and the pattern in which all the pels are darkened, i.e. all black, is associated with a density value of "255". This range, illustratively "0" to "255", is chosen to equal the range of density values in a contone image that is to be halftoned. This results in a table such as that shown in FIG. 4 that relates dot number, where the value of the number specifies the particular sequential dither pattern, to normalized gray level for that dither pattern.

The normalized values are used as threshold values. In particular, a threshold matrix is constructed on a 1:1 basis with the dither matrix in which the number of pels in each position in the dither matrix is replaced by the lowest normalized gray level for the associated dither pattern containing that number of printed pels. This results in threshold matrix 510 shown in FIG. 5 given dither matrix 200 shown in FIG. 2 and the normalized gray levels (values) shown in FIG. 4.

Now, if threshold matrix 510 were only to be used in printing dither patterns given incoming contone values, then if any gray level were to be printed that lies intermediate to the thresholds given in the matrix, this would result in a gray level error. This gray level error would, as is known in the art, be propagated (diffused) from one tile to the next in an effort to modify the gray levels that are to be printed in these tiles and thereby provide an increasingly accurate gray level rendition of a contone image. Unfortunately, I have found that propagating the gray level error associated with a single dither matrix from tile to tile in many instances yields an insufficiently accurate gray level depiction in a halftoned rendition of a contone image.

In accordance with the teachings of my present invention, I have discovered that an increased number of gray levels can be produced in a halftoned image through use of multiple dither matrices that provide gray levels that effectively bracket the gray level of interest where the particular matrix that is selected for use in halftoning a given tile is based upon the error associated with and propagated to that tile.

Figures 4, 5, 6:
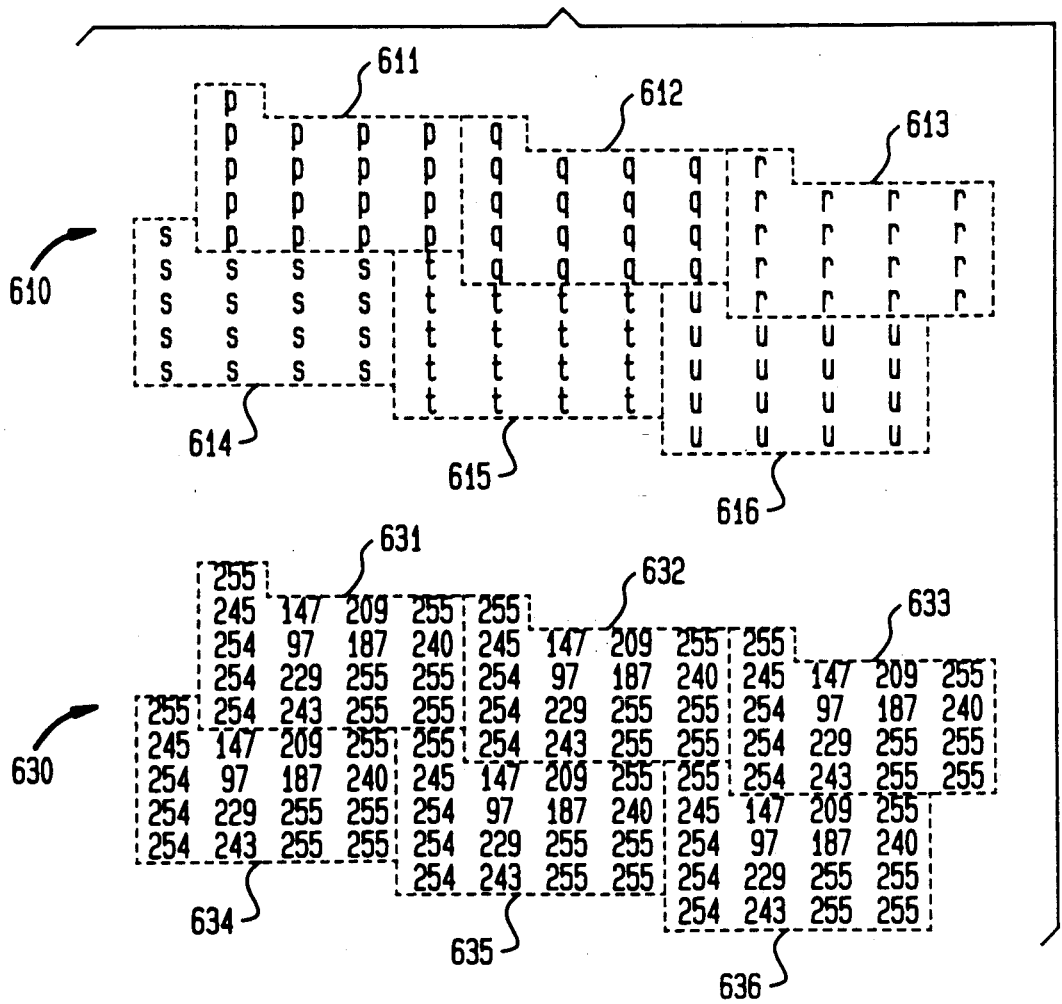
FIG. 4 depicts a table giving typical normalized gray values associated with the individual dither patterns defined by the dither matrix shown in FIG. 2.
FIG. 5 depicts two threshold matrices, 510 and 530, associated with the dither matrix in FIG. 2 and in terms of the normalized gray values given in FIG. 4, wherein threshold matrix 530 contains one incrementally lower threshold value in each pel position than that contained in threshold matrix 510.
FIG. 6 depicts a region of an image tiled with a screen pattern contained in image portion 10 shown in FIG. 1 and the corresponding threshold values therefor.

As such, given threshold matrix 510 shown in FIG. 5, I now construct a second threshold matrix 530 in which illustratively the normalized gray value at each position in matrix 530 is that which is associated with the next lower dot number, as defined by the table given in FIG. 4, used in constructing matrix 510. Inasmuch as the two dither patterns defined by matrices 510 and 530 differ by merely one dot, a human eye will, when seeing a halftoned image area composed of uniform patterns defined by both of these matrices, spatially integrate the difference between these individual patterns, to see gray levels that are intermediate to those that can be produced through use of one matrix, e.g. matrix 510, alone. Clearly, second matrix 530 is not limited to containing a dither pattern that varies by only one pel at each step from that given in first matrix 510 but can instead contain any desired variation. However, I found that a one pixel variation between these dither matrices is quite sufficient to visually reduce gray level error that would otherwise be noticeable through use of only one such dither matrix.

Therefore, given an intermediate gray level as defined by a corresponding incoming contone value in the image to be halftoned, matrix 510 will produce a dither pattern that has a minimum gray level content for that value, while matrix 530 will produce a dither pattern that has a maximum gray level content for that value, thereby bracketing the intermediate gray level that is desired. Due to error propagation occurring from block to block over a halftoned image area, as set forth in detail below, each halftoned block in this area will selectively be tiled with the patterns defined by matrix 510 or those defined by matrix 530. This selection will vary from block to block throughout this area. The one pel difference between these dither patterns will be spatially averaged by a human eye to yield a gray level in this area that substantially equals the desired intermediate gray level and hence the contone value that is to be depicted therein. As such, my inventive technique permits intermediate gray levels to be produced that can not be produced through use of either dither pattern alone.

I have determined that error propagation should occur in a fixed manner throughout a tiled image and specifically from the center of each tile to the next. In this manner, error is propagated in a manner that is spatially synchronized to essentially whatever dither pattern is to be used. If the error were to be distributed throughout regions in the halftoned image that were not identical to and identically aligned with the screen cells, then objectionable low frequency Moire patterns would likely result in the halftoned image as the result of error propagation. In addition, the error is collectively propagated in a manner that is identical from one tile to the next throughout the tiled image.

Hence, once all the threshold (and hence dither) matrices are defined, the center of these matrices must be defined. To provide accurate image rendition, the center is generally taken to be the pel location in each matrix at which the differences between the first and second threshold matrices is the largest. It is this central point associated with each matrix that generally, depending upon actual data, defines the first pel in the dither pattern that will be darkened. For matrices 510 and 530 shown in FIG. 5, the center corresponds to the location of the pel with threshold value "97" shown in matrix 510 and with threshold value "0" shown in matrix 530.

With the screen pattern, the dither matrices and the accompanying threshold matrices, and the center of these matrices all defined, initialization is now complete. The printer is now ready to subsequently print any number of halftoned images with these image parameters using my inventive error propagation and halftoning method. Hence, I will now address those steps that are performed on each image pixel for error propagation and halftoning.

B. Error Propagation and Halftoning steps

First, a stream of incoming contone values to be halftoned is pre-processed to perform any needed range and input adjustments, such as to modify c⁻ ᵗrast, brightness or other image characteristics. Range and input adjustments are typically performed through a table look-up operation in which a stored table is accessed with an incoming pixel value and generates, as its output, a suitably corrected pixel value. In addition, the pixel pre-processing generates one gray level pixel value for each binary pel that can exist in the halftoned image. As such, the incoming image may need to be scaled, through any one of many well methods, either by appropriately inserting more pixels into the incoming stream or appropriately reducing the number of pixels therein, such that the resulting pixels, when printed as halftoned pels, will fit into the area previously established for the output image.

Second, each gray level pixel value in the contone image is then associated with a position in the first threshold matrix by tiling the entire image with this matrix. As a result, each pixel in the contone image has a specific threshold value associated with it. FIG. 6 depicts a region of an image tiled with a screen pattern contained in image portion 10 shown in FIG. 1 and the corresponding threshold values therefor. Specifically, as shown image portion 610 is partitioned into six halftone blocks 611, 612, 613, 614, 615 and 616. The pixels that form these separate blocks are illustratively identified by a different letter, i.e. "p", "q", "r", "s", "t" and "u" for the pixels that form blocks "611", "612", "613", "614", "615" and "616". The resulting threshold values associated with the pixels that form image portion 610 are shown in tiled image portion 630 in which the appropriate threshold value from matrix 510 shown in FIG. 5 is located in each corresponding pixel location. As such, threshold matrix 510 has been correspondingly replicated (tiled) six times within image portion 630 to form identical threshold matrices 631, 632, 633, 634, 635 and 636 as shown in FIG. 6.

Third, now given this tiled pattern, the gray level value, $g_0$, of the portion of the image that corresponds to each tile of threshold values is determined. This gray value can be readily determined by merely taking the gray value that exists at the pel associated with the center (or other suitable fixed) location of the corresponding tile of threshold values. Alternatively, the average of all gray values in the tile could be calculated and used as gray level value $g_0$. This latter approach is not recommended inasmuch as it requires more computations than the former approach. For image areas of uniformly or gradually changing gray value, use of the gray value at the center of a tile will very accurately represent the gray value, $g_0$, of that entire tile. In areas of rapidly changing gray values, such as at an edge, the center pixel may not accurately represent the gray value of the tile. However, at edges and other sharp transitions in the image, accurate gray level rendition is not so important. Even so, use of the gray value at the center of the tiles in these areas, i.e. edges and similar image transitions, will only slightly affect the resulting appearance of these areas in the resulting halftoned image. If improved accuracy is desired in these areas, then an average value of all the pixels in the tiles that occupy these areas can be computed and used, if necessary.

Once the gray value is determined for each tile for the image, the highest threshold value, $t_0$, which is less than or equal to the gray value, $g_0$, is determined for all these tiles. This can be readily performed through a look-up operation into the list of normalized gray values shown in FIG. 4. If no threshold value is less than the gray value $g_0$, then threshold $t_0$ is zero. For example, if gray value $g_0$ for a tile equals "5", then threshold $t_0$ to be used is "0"; likewise, if gray value $g_0$ for a tile equals "200", then threshold $t_0$ to be used is "187", and so on for other gray values $g_0$. The resulting gray level error, $g_0 - t_0$, would exist for each tile if only matrix 510 were used to depict halftone patterns in the image without error propagation.

In an effort to reduce the gray level error for each tile, the gray level value, $g_e$, attributable to the current tile and the gray level error propagated, in the specific manner as set forth below, to this tile from any other tiles, is determined according to the following equation:

$$g_e = g_0 + e_p \qquad (1)$$

where: $e_p$ = the total gray level error propagated to the current tile.

The value $g_e$ represents the gray level value that is to be depicted, i.e. that is to be "used up" if possible, by the current tile including the error propagated from surrounding tiles. Now, if the total gray level value, $g_e$, for the current tile is greater than the next successive threshold value above $t_0$, then the selected threshold value, $t_s$, that is to be used for this tile is the next higher threshold value, otherwise $t_s$ is set equal to $t_0$.

At this point, the remaining amount of gray level (gray value error) in the current tile is now determined and then propagated to surrounding tiles that have yet to be processed. The same error propagation paths are used from tile to tile throughout the tiled image. The gray value error, $e$, for the current tile is given by equation (2):

$$e = g_e - t_s \qquad (2)$$

This error is propagated to surrounding unprocessed tiles by dividing the total error, $e$, into three components, $e_1$, $e_2$ and $e_3$, and propagating the error for each component, given an orthogonal screen grid, to two tiles that are adjacent to the current tile and oriented at 90 degrees to each other and to a third adjacent tile oriented at 45 degrees to the current tile and 135 degrees from the other tile, as set forth by the following equations:

$$e_3 = e(0.25 \times x) \qquad (3)$$

$$e_2 = (e - e_3)/2 \qquad (4)$$

$$e_1 = e_2 \qquad (5)$$

where: $x$ = a pseudo-random number within the range 0 to 0.5. This random number is used to inject a slight amount of noise into the halftoned image in order to break up false contouring and/or other undesirable periodic patterns that might otherwise appear in this image.

The location of the tiles to which the error is to be propagated is shown in FIG. 7 for each of the image portions and screen patterns shown in FIG. 1. As shown, for screen pattern 710, the total error, $e$, for current tile 712 is propagated as components $e_1$, $e_2$ and $e_3$ to adjacent tiles 713, 715 and 714, respectively. Similarly, for screen patterns 720, 730 and 740, the total error, $e$, for corresponding current tiles 722, 732 and 742, is propagated as components $e_1$, $e_2$ and $e_3$ to respective adjacent tiles 721, 723 and 724; tiles 733, 735 and 734; and tiles 741, 744 and 745. All the paths along which gray value error is propagated is to the right and/or down. Furthermore, for any given screen, the paths are identical throughout that screen. As such, tiles can be advantageously processed left-to-right and top-to-bottom, with the error being appropriately propagated only to unprocessed tiles. Thus, when a particular tile in a image being halftoned is to be processed, the needed error components will already have been calculated for that tile. A set of three different propagation paths can be found for any orthogonal screen orientation. Although the gray value error is collectively shown as being propagated to preferably three tiles situated adjacent to a tile currently being processed, this error could instead be collectively propagated to differently situated tiles as well as to a greater or lesser number of tiles than three, in which case suitably different equations than equations (3)–(5) above would be used to partition the gray value error into appropriate components.

Now, with the threshold values from the first threshold matrix having been arranged to form a tile pattern as set forth above, a dithering operation is undertaken using actual contone values from an image that is to be halftoned. However, based upon the value of $t_s$ for a tile, the specific threshold values used in dithering the pixels that are associated with that tile are selected from either the first or second threshold matrix.

Specifically, to perform dithering, the value of each gray level image pixel in the contone image is compared with its associated tiled threshold value. To illustrate this process, consider FIG. 8 which depicts illustrative input pixel values for image portion 800 that contains pixels associated with the six tiles shown in FIG. 6. The corresponding cells (which will also for convenience be referred to as tiles) in image portion 800 are labelled as tiles 801, 802, 803, 804, 805 and 806. Each pixel in image portion 800 that is associated with the center of each separate tile of threshold values is marked with an asterisk.

In general, with dithering, if the gray level for the pixel is less than its corresponding threshold value, a pel is not printed at a corresponding location in the halftoned image, i.e. the value of this pel is set equal to zero. Alternatively, if the gray level is equal to or greater than its corresponding threshold value, a pel is printed at a corresponding location in the halftoned image, i.e. the value of this pel is set equal to one.

Now, according to the teachings of my invention, I select the particular threshold value for use in dithering each incoming pixel value from either of the two threshold matrices depending upon the selected threshold value for that tile of incoming pixel values. Specifically, for those tiles of pixels where the gray level error is not sufficiently high that the selected threshold value, $t_s$, was not set to the next higher threshold value, i.e. it remains at threshold value $t_0$, then the first threshold matrix is used. Alternatively, where the gray level error for a tile is sufficiently large to cause the next higher threshold value to be selected, then that tile is thresholded against the second threshold matrix, which contains incrementally lower threshold values, instead of the first threshold matrix, in order to add an additional printed pel into the halftoned image area associated with this tile.

In particular, FIG. 9 depicts the specific manner in which the tiles shown in FIG. 8 are processed to determine appropriate threshold values, particularly including error propagated from tile to tile. Inasmuch as tiles are processed left-to-right and top-to-bottom, the center values (gray values $g_0$) of the tiles within image portion 800 that are encountered, in their order of occurrence, are: "70", "80", "90", "110", "120" and "130". The error calculations for each of these center values is specifically shown in FIG. 9. In particular, for tile 801, its center pixel value and hence its tile gray value is "70". Inasmuch as this gray value is less than the threshold for any darkened pattern specified by the table provided in FIG. 4, the highest threshold value, $t_0$, for this tile is zero, as shown in FIG. 9. Since no error, e, has been propagated to this tile, the tile gray level value, $g_e$, remains at "70". Furthermore, because this tile gray level value is not higher than the next threshold value above threshold $t_0$ for this tile, i.e. value "97", from the table given in FIG. 4, then the selected threshold, $t_s$, for this tile remains at the value $t_0$, i.e. zero. Consequently, tile 801 is dithered using the first threshold matrix, i.e. matrix 510 shown in FIG. 5. Moreover, the gray level error associated with this tile, i.e. "70", is propagated, as determined by equations (3-5) given above, in the amounts $e_2$ and $e_3$ each equalling approximately "15" to adjacent tiles 802 and 804 shown in FIG. 8. Error $e_1$ which approximately equals "39" would also be propagated to a tile situated immediately to the left of tile 804 and outside of image portion 800. Tile 802, which is the next tile to be processed, has a center pixel value and hence a tile gray value, $g_0$, of "80". As such, the highest threshold value, $t_0$, associated with this tile and given by the table shown in FIG. 4 is also zero. The gray level value, $g_e$, for this tile is then calculated as being equal to the sum of the tile gray value for this tile, i.e. "80", and gray level error that has been propagated to this tile, i.e. "15". Inasmuch as the resulting tile gray level value still remains below the next successive threshold value above $t_0$, i.e. "97", then the value threshold $t_s$ remains at the value for threshold $t_0$, i.e. zero. Accordingly, the first threshold matrix, i.e. matrix 510 shown in FIG. 5, is used to dither tile 802. Furthermore, the gray level error, e, associated with tile 802 is propagated as values $e_1$ equalling approximately "27" and values $e_2$ and $e_3$ both equalling approximately "34" to adjacent tiles 804, 803 and 805, respectively. This processing continues for remaining tiles 803, 804, 805 and 806 as shown in FIG. 9. For tiles 803, 804 and 805, the gray level values for each of these tiles is sufficient at the respective values "124", "152" and "174", to exceed the next higher threshold value than $t_0$ for each of these tiles, i.e. the values "0" for tile 803 and "97" for tiles 804 and 805. Accordingly, the threshold $t_s$ for each of these tiles becomes the next higher threshold value, i.e. "97" for tile 803 and "147" for tiles 804 and 805. Consequently, the second threshold matrix, i.e. matrix 530 shown in FIG. 5, is used to dither tiles 803, 804 and 805. If the value of the center pixel of each tile is taken to be the gray value of that tile, then my inventive technique only requires that those lines of contone values, here lines 1-6 as shown in FIGS. 8 and 9, that contain one or more tile centers in the image be processed for error propagation using my technique. However, all the lines would be processed for halftoning. Even so, this simplifies the implementation of my technique.

The resulting threshold patterns for tiles 801, 802, 803, 804, 805 and 806 that result from my inventive technique are shown as corresponding tiled threshold patterns 1001, 1002, 1003, 1004, 1005 and 1006 which collectively form image portion 1000 in FIG. 10. As can be seen from this figure, threshold matrix 510 is situated in tiles 1001, 1002 and 1006; while threshold matrix 530 is situated in tiles 1003, 1004 and 1005.

Given the pattern of tiled threshold matrices shown in FIG. 10 for the image portion shown in FIG. 8, FIG. 11 provides a resultant portion of a bit-mapped halftoned image showing the actual pels that will be darkened to form dither patterns given the contone values appearing in FIG. 8.

C. Software Implementation

My inventive technique can readily be implemented in software as two subroutines: Main Routine 1200 shown in FIGS. 12A and 12B and Halftone Routine 1300 which is called by the Main Routine and is shown in FIGS. 13A and 13B. These subroutines are typically usually executed as part of a larger image processing program in a well-known digital image processor, such as a suitable digital computer (not shown), that supplies data to the printer. Inasmuch as the rest of the image processing program is superfluous to an understanding of my technique, the following discussion will center on these two routines and the additional initialization required therefor.

To facilitate digital image processing using my inventive technique and as noted above, only those lines of contone values that contain a tile center need to be processed for error propagation according to my inventive technique. However, all the lines would be processed for halftoning. Moreover, for an image to be tiled with 4-by-4 pel halftone blocks, the threshold patterns regularly repeat throughout the image such that four strings, each having the same number of pel locations as an image line, will contain all the different threshold values arranged in proper sequential order for the image. The number of such strings will be governed by the screen angle for the halftoned image. For example, for image portion 630 shown in FIG. 6 that has been tiled with threshold matrix 510 shown in FIG. 5 wherein the screen angle is approximately −14 degrees, a single string of threshold values, rh(i) where i is a pointer, extending to the entire width of the image will be sufficient to store the proper sequence of all tiled threshold values thereof. This string contains the threshold values "255", "254", "243", "255", "255", "254", "229", "255", "255", "254", "97", "187", "240" and so on across the image. One such string is fabricated using each of the two different threshold matrices, i.e. string rh(i) for higher valued threshold matrix 510 and string rl(i) for lower valued threshold matrix 530. If on the other hand, the screen angle is 90 degrees, as in image portion 30 shown in FIG. 1, then four separate strings extending to the entire width of the image will be needed to store all the threshold patterns in their proper sequential order for the entire image. By using such a string(s) for each of the two different threshold matrices greatly reduces the storage requirements needed to process an image using my inventive technique. These strings are fabricated during part of the initialization procedure described above and thereafter are repeatedly used in printing successive images. For purposes of simplification, the following discussion will assume that only two separate strings of threshold values, rh(i) and rl(i), are to be used and have been appropriately fabricated during an initialization procedure.

Figure 12:
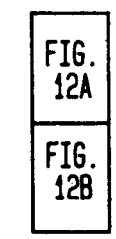
FIG. 12 shows the proper alignment of the drawing sheets for FIGS. 12A and 12B.
Figure 12A:
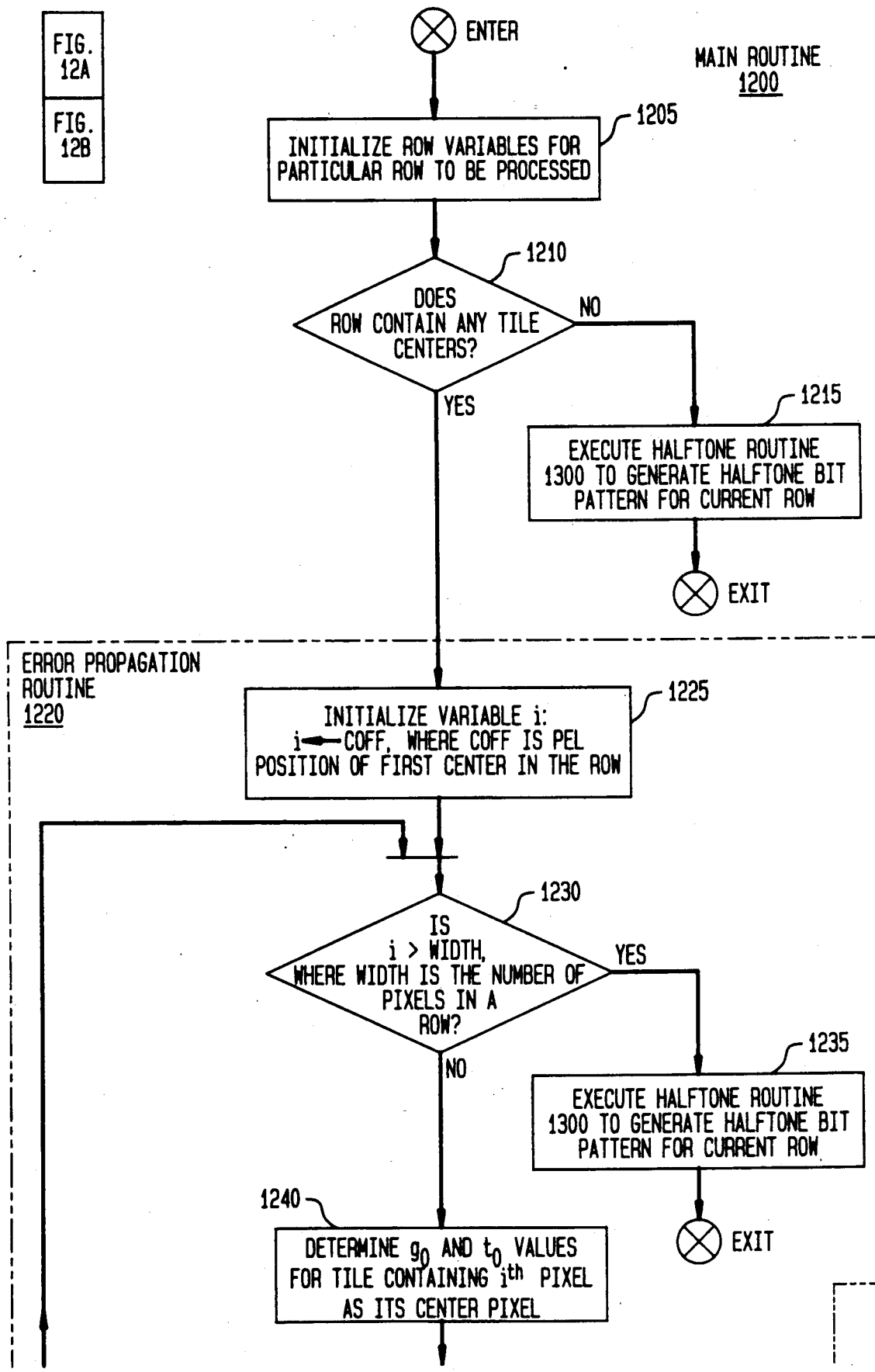
FIGS. 12A and 12B collectively depict a flowchart of Main Routine 1200 that implements my inventive technique.
Figure 12B:
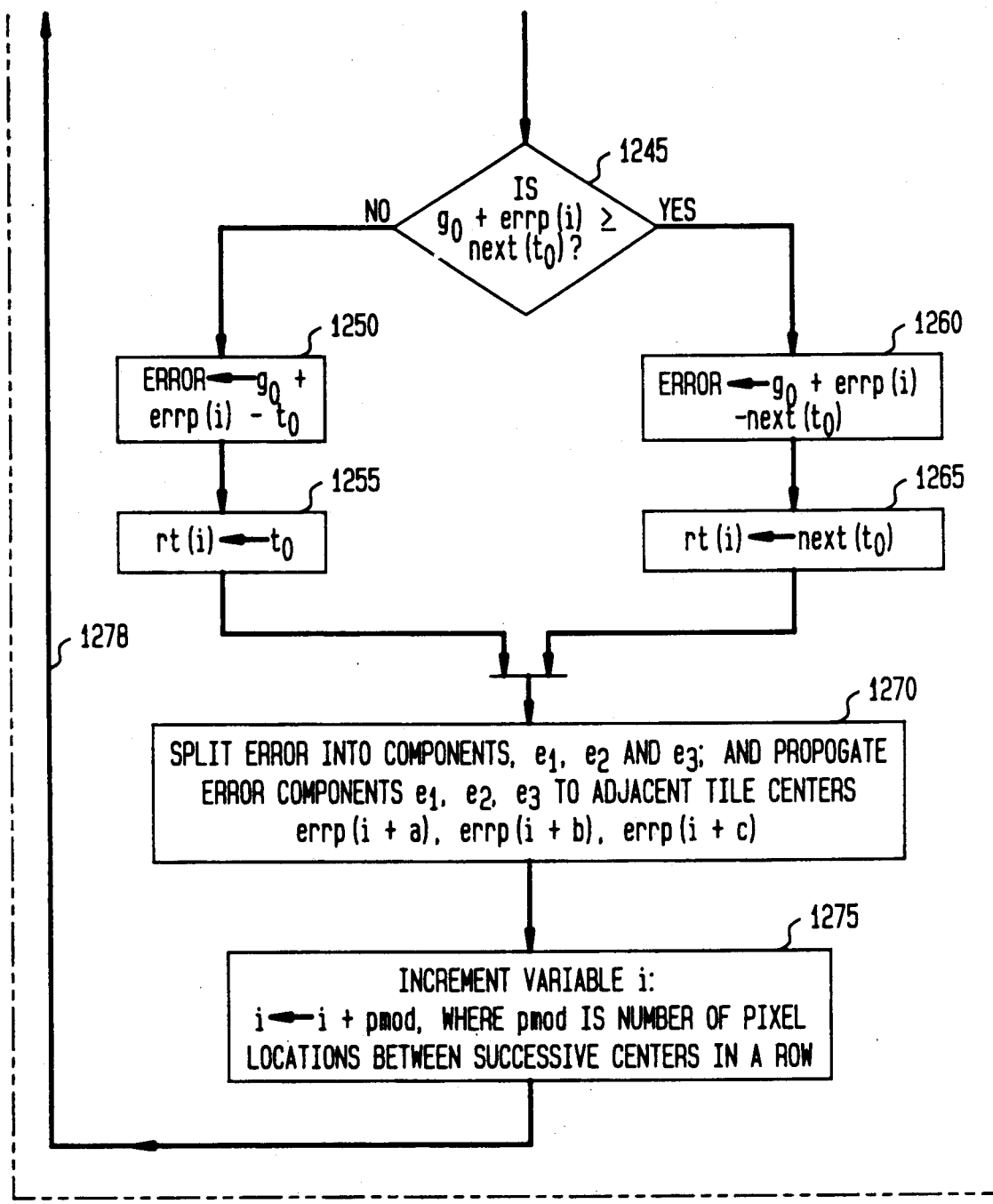

With this in mind, a flowchart of Main Routine 1200 that implements my inventive technique is collectively depicted in FIGS. 12A and 12B, for which the proper alignment of the drawing sheets for these figures is shown in FIG. 12.

Upon entry into routine 1200, execution first proceeds to block 1205 which, when executed, initializes the values of various row variables, such as pointers and temporary variables, for the particular row in the image that is to be processed. Thereafter, execution proceeds to decision block 1210. This decision block, when executed, determines if the current row of input pixels contains a pixel that spatially corresponds to the center of any tile. In the event that the row does not contain any such centers, then decision block 1210 routes execution, via its NO path, to block 1215. This latter block, when executed, invokes Halftone Routine 1300 to generate appropriate dithered values for each pixel in the current row of input pixels. Thereafter, once Halftone Routine 1300 has fully executed, then execution proceeds from block 1215 to exit from Routine 1200.

Alternatively, if the current row of input pixels contains a pixel that spatially corresponds to a center of any tile, then decision block 1210 routes execution, via its YES path, to Error Propagation Routine 1220. This routine calculates the gray value, $g_0$, determines the threshold value, $t_0$, and selects the appropriate threshold matrix for use in dithering the current tile from one of the two strings of threshold values and propagates the remaining gray level error to centers of adjacent tiles.

In particular, within routine 1220, execution first proceeds to block 1225 which, when executed, initializes the variable "i" to the value COFF which equals the relative pixel position of the first tile center in the current row. Thereafter, execution proceeds to decision block 1230 which tests the value of variable i. In the event that the value of this variable exceeds value WIDTH, where this value equals the width in pixel positions of a row, then decision block 1230 routes execution, via its YES path, to block 1235. This latter block, when executed, invokes Halftone Routine 1300 to generate appropriate dithered values for each pixel in the current row of input pixels. Once Halftone Routine 1300 has fully executed, then execution proceeds from block 1235 to exit from Routine 1200. Alternatively, in the event that the current value of variable "i" equals or is less than the value WIDTH indicating that a tile center exists within the current row, then execution proceeds, via the NO path emanating from decision block 1230, to block 1240. This latter block, when executed, determines both tile gray value $g_0$ for the tile containing the ith pixel as its center pixel and threshold value $t_0$ for this tile. As noted, the tile gray value is merely taken as the gray level contone value of the center pixel contained within that tile. Thereafter, execution proceeds to decision block 1245. This decision block, when executed, tests whether the combined gray value for the current tile and the gray level error being propagated thereto, i.e. errp(i), exceeds the value of the lowest threshold value, i.e. next($t_0$), that is greater than threshold $t_0$. The values of propagated error, errp(i), for the tile centers in the current row are stored in a separate string for easy access. In the event that the combined gray value and the propagated error for the current tile do not exceed the value of threshold next($t_0$), then decision block 1245 routes execution, via its NO path, to block 1250. This latter block, when executed, determines the gray level error value, ERROR, for the current tile as being the difference between the gray value that should be printed he current tile ($g_0$+errp(i)) and that which can be printed thereat (t₀). Thereafter, execution proceeds to block 1255 which selects threshold $t_s$ to be used for this tile, i.e. rt(i), as the value of threshold t₀. Execution then proceeds to block 1270. Alternatively, in the event that the combined gray value and the propagated error for the current tile exceed the value of threshold next(t₀), then decision block 1245 routes execution, via its YES path, to block 1260. This latter block, when executed, determines the gray level error value, ERROR, for the current tile as being the difference between the gray value that should be printed at the current tile (g₀+errp(i)) and that which can be printed thereat next(t₀). Thereafter, execution proceeds to block 1265 which selects threshold $t_s$ to be used for this tile, i.e. rt(i), as the value of threshold next(t₀). Execution then proceeds to block 1270.

Block 1270, when executed, splits the gray level error value, ERROR, for the current tile into three components, such as through use of equations (3–5) as discussed hereinabove. These components are then propagated to three adjacent tile centers by merely storing each error component in a corresponding location in the errp(i) string for the current row, such as errp(i+a), errp(i+b) and errp(i+c) where a, b and c are horizontal offsets from the current tile center to other respective tile centers to which an error component for the current tile is to be propagated. Thereafter, execution proceeds to block 1275 which, when executed, increments the value of variable "i" by the value "pmod" which equals the number of pixel elements between successive tile centers. Once this occurs, execution loops back, via path 1278, to decision block 1230 to determine if another tile center exists within the current row of input pixels and so on.

A flowchart of Halftone Routine 1300 that is executed as part of Main Routine 1200 is collectively depicted in FIGs. 13A and 13B, for which the correct alignment of the drawing sheets for these figures is shown in FIG. 13. This routine, as noted, generates appropriate dithered values for each pixel in the current row of input pixels.

Upon entry into routine 1300, execution proceeds to block 1305 which, when executed, initializes the value of variable "i" to one. Thereafter, execution proceeds to decision block 1310 which determines whether the current value of variable "i" exceeds the width, WIDTH, of a row of input pixels. If the value of variable "i" exceeds the value WIDTH, then the entire row of input pixels has been completely halftoned at which point execution returns to routine 1200 from routine 1300, via the YES path emanating from decision block 1310 routes execution. Alternatively, if additional input pixels in the current row remain to be halftoned, in which case the value of variable "i" equals or is less than the value WIDTH, then execution proceeds, via the NO path emanating from decision block 1310, to block 1315. Block 1315, when executed, sets the value of variable "data" to the input contone value situated at position (i) in the current row. Thereafter, block 1320 is executed to set the value of the output pel at pel position (i) in an output pel string to zero.

At this point, execution proceeds to decision block 1325 which determines if the value of variable "data", i.e. the contone value for the current pixel being processed, is greater than or equals the appropriate lower threshold value, i.e. rl(i). If the contone value is less than this threshold value, then the pel associated with the current pixel is to remain white. Accordingly, decision block 1325 routes execution, via NO path 1328, to block 1345. Alternatively, in the event that contone value equals or exceeds this threshold value, then decision block 1325 routes execution, via its YES path, to decision block 1330. This latter decision block determines whether the contone value for the current pixel is greater than or equal to the appropriate higher threshold value, i.e. rh(l). If the contone value equals or exceeds this higher threshold value, then decision block 1330 routes execution, via its YES path, to block 1340. This latter block, when executed merely sets the output bit at pel location (i) to one, in order to darken the pel corresponding to the current input pixel. Execution then proceeds to block 1345. Alternatively, if the contone value is not greater than or equal to the appropriate higher threshold value, then decision block 1330 routes execution, via its NO path, to decision block 1335. This latter decision block determines whether the selected threshold value for the current center pixel equals or exceeds current upper threshold value rh(i), i.e. whether rt(i+cd(i))≧rh(i) where cd(i) is an incremental positional value for variable i that locates the center pixel for the tile containing pixel (i). In the event that the selected threshold does not exceed the higher threshold rh(i), then decision block 1335 merely routes execution, via its NO path, to block 1345. As such, the value of the pel corresponding to the current pixel remains zero. However, if the selected threshold exceeds the higher threshold value, then decision block 1335 routes execution, via its YES path, to block 1340 which, as noted, changes the value of the pel at position (i) to one. Block 1345, when executed, merely increments the value of variable "i" by one to point to the next successive input pixel in the current row. Once this has occurred, execution loops back, via path 1348, to decision block 1310 to determine whether the current row of input pixels has now been completely halftoned and so on.

The routines described above process an image in one pass therethrough. Specifically, error determination and propagation and threshold selections, where appropriate, and halftone dithering are performed on one row of input pixels at a time before these operations are performed on a next successive row of input pixels. Alternatively, error determination and propagation and threshold selection can be performed in one pass through an image for every row in the image that contains a center pixel, while a second pass through the image could be used for halftone dithering of each of these pixels in each row of the image. Moreover, with either approach, multiple image rows can be processed at a time with error calculations using propagated error obtained on a look ahead basis. Although processing multiple rows at at time requires more temporary storage than does processing a single row, obtaining propagated errors on this basis allows the rows in a current tile that are located above the row containing the center pixel for this tile to be dithered using a matrix that has already been selected for this tile.

Furthermore, while the inventive technique has been described in terms of illustratively using two separate dither matrices and selecting one of these matrices for use in halftoning a given tile based upon the gray level error associated with that tile and propagated thereto, clearly, more than two such dither matrices can be used to provide a greater number of intermediate gray levels in a tiled area of a halftoned image than that capable of being depicted by use of only two such matrices. Of course, as more dither matrices are used to tile an area with selection occurring thereamong based upon gray level error value, the tonal differences between the additional number of intermediate gray levels obtained thereby may be too slight to be perceived by a human observer and thus not warrant the additional complexity associated with use of an increased number of additional dither matrices.

Although a preferred embodiment of the present invention has been shown and described herein, many other varied embodiments that incorporate the teachings of the present invention may be easily constructed by those skilled in the art.

I claim:

1. A method for generating a halftone pel pattern for depicting a continuous tone image, wherein said pattern is to be reproduced on a binary output device, said method comprising the step of:

establishing a correspondence between identically shaped tiles that form a pre-defined tile pattern and individual pixel values that collectively form at least a portion of a continuous tone gray level image;

determining, for each of said tiles, a gray value, $g_0$, of the pixel values that correspond to that tile;

determining, for each of said tiles, one, $t_0$, of a plurality of pre-defined threshold values that has a highest value less than or equal to said gray values $g_0$ for that tile;

determining, for each of said tiles, a gray level value, $g_3$, of the pixels that correspond to that tile wherein said gray level value is formed in response to both the gray value, $g_0$, of that tile and propagated gray level error established therewith and propagated thereto;

determining, for each of said tiles, whether the gray level value, $g_e$, for that tile equals or exceeds the value of a successively larger threshold value, contained within said plurality of pre-defined threshold values, than threshold value $t_0$ associated with that tile;

setting, in response to said determining step, a threshold value, $t_s$, for each of said tiles as either said threshold value $t_0$ for that tile or said successively larger threshold value;

ascertaining, for each of said tiles, an amount of gray value error, e, as equalling the gray level value, $g_e$, for said each tile less the set threshold value, $t_s$, associated therewith;

partitioning, for each of said tiles, the gray value error, e, into a plurality of pre-defined components;

propagating the value of each of the components for each of said tiles to a pre-determined corresponding one of a plurality of tiles situated adjacent to said each tile, wherein the gray value error is collectively propagated along identical paths from tile to tile throughout the tile pattern; and dithering the pixel values corresponding to each one of said tiles using either a first or second matrix of pre-defined threshold values to form a halftone dithered pel pattern spatially corresponding thereto wherein the matrix to be used for said one tile is selected in response to the set threshold value $t_s$ associated therewith, such that a dithered halftone pel pattern that corresponds to said one tile is formed within the halftone image and which, when viewed with other such dithered halftone patterns appearing in said halftone image and associated with tiles adjacent thereto, spatially depicts a discrete gray level that can not be obtained through use of dithering said pixel values using either said first or second matrix alone.

2. The method in claim 1 wherein the predefined threshold values in said first and second matrices are normalized gray values associated with pre-defined dither patterns and each of said threshold values located in said second matrix is associated with a dot number that is numerically less than the dot number associated with the threshold value situated in the corresponding location in said first matrix.

3. The method in claim 2 wherein corresponding ones of said pre-defined threshold values in said first and second matrices are those associated with corresponding ones of said dither patterns that differ by only one dot number.

4. The method in claim 3 wherein said partitioning step comprises the step of separating said gray value error, e, for a current tile being processed into three components, $e_1$, $e_2$ and $e_3$, therefor, and said components value propagating step comprises the step of propagating values of the components $e_1$, $e_2$ and $e_3$ to respectively first, second and third tiles collectively situated downward and to the right of said each tile.

5. The method in claim 4 wherein said first and second tiles are perpendicularly oriented to each other and the third tile is oriented at approximately 45 degrees from the first tile and approximately 135 degrees from the second tile.

6. The method in claim 5 wherein said setting step comprises the step of choosing the value of threshold $t_s$ for each tile as equal to the successive threshold value for that tile if gray level value, $g_e$, for that tile is greater than or equal to that successive threshold value or to threshold value $t_0$ if gray level value, $g_e$, for that tile is less than that successive threshold value.

7. The method in claim 6 wherein the tiles that form said tile pattern are oriented at a particular screen angle and each of said tiles has a size equal to that of a halftone block in said halftoned image.

8. The method in claim 7 wherein the tiles are oriented to form a screen grid aligned along a pair of orthogonal axes.

9. The method in claim 7 further comprising the step of: processing pixel values that form said continuous tone image such that a 1:1 spatial correspondence is established between each of the pixels in the continuous tone image and each pel in the halftoned image.

10. The method in claim 7 wherein said processing step further comprises the step of modifying contrast or brightness of the pixels that form said continuous tone image to generate corrected pixel values.

11. The method in claim 7 wherein the separating step comprises the step of determining the values of the components $e_1$, $e_2$ and $e_3$ in accordance with the following equations: $e_3 = e(0.25 + x)$, $e_2 = (e - e_3)/2$ and $e_1 = e_2$ where: x = a pseudo-random number within the range 0 to 0.5.

12. The method in claim 7 wherein the gray level value $g_e$ determining step comprises the step of calculating the gray level value, $g_e$, for each of said tiles as the sum of gray value $g_0$ for that tile and the value of the propagated gray level error associated therewith and propagated thereto.

13. The method in claim 7 wherein the gray value, $g_0$, determining step comprises the step of establishing the gray value, $g_0$, for each of said tiles as being the gray level value of a pixel situated at a pre-defined fixed location within that tile.

14. The method in claim 7 wherein said gray value, $g_0$, determining step comprises the steps of:
    determining, for each of said tiles, the average gray level value of all the pixels that correspond to that tile; and
    setting the gray value, $g_0$, for that tile as equal to the average gray level value determined therefor.

* * * * *